Figure 1:
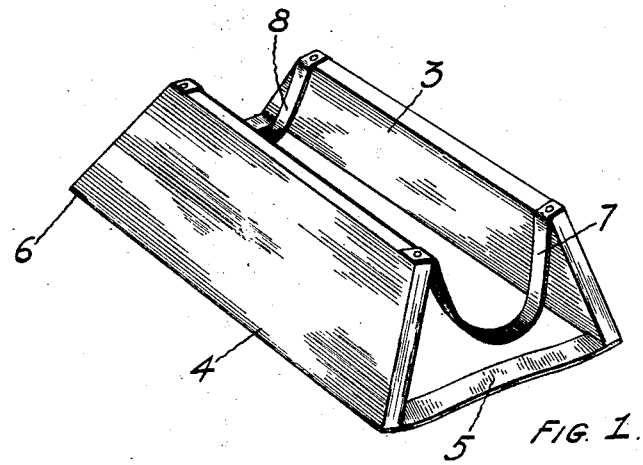

May 10, 1927.

R. W. CLARK

TIRE DISPLAY HOLDER

Filed Aug. 10, 1923

1,628,306

INVENTOR
RUFUS W. CLARK.
BY
ATTORNEY

Patented May 10, 1927.

1,628,306

UNITED STATES PATENT OFFICE.

RUFUS W. CLARK, OF AKRON, OHIO, ASSIGNOR TO THE GOODYEAR TIRE & RUBBER COMPANY, OF AKRON, OHIO, A CORPORATION OF OHIO.

TIRE-DISPLAY HOLDER.

Application filed August 10, 1923. Serial No. 656,654.

My invention relates to means for supporting tires in an upright position for the purpose of displaying them in sales rooms, display windows and the like. The object of my invention consists in providing a relatively inexpensive tire holder which will securely hold the tire in the proper position, and which will not mar the surface upon which it rests.
Heretofore, certain types of tire holders have been provided which consist of two separate units, each comprising a side member and two end members, the latter of which are provided with offset portions at the middle thereof, which are pivotally connected together so as to join the two units to constitute a complete holder.

Several objections have arisen to the above mentioned type of holder which renders it unsatisfactory. When the tire is placed within the rack, the weight of the tire rests upon the offset pivotally connected portions causing the lower ends of the end members to spread and causing the upper ends to clampingly engage the tire. The weight of the tire must be placed upon the pivotally connected portions before the lower portions of the end members are spread. Thus, these members which engage the surface upon which the stand rests, must move over the floor with a relatively great pressure exerted thereupon. This not only marks the surface upon which it rests, but this force opposes the clamping action exerted by the weight of the tire. Since the primary object of the holder is to securely hold the tire, this opposition to the clamping action is detrimental to the successful operation thereof.

Also, the tire engaging portions of the end members can be designed to properly fit only one size of tire, and in an effort to so design them as to serve for all sizes of tires, they are usually so made as to fit none properly. Generally, such holders engage the tire at but three points, and, on account of its flexibility, distort it, thus preventing the proper display thereof.

By my invention, I have eliminated the aforementioned objections. Briefly speaking, my invention comprises a holder consisting of two rigid side members connected at the bottom at each end by two semi-flexible members which prevent movement of the bottom of the side members on the surface on which they rest, and two flexible members attached to the top portions of the side members adjacent the ends. These members conform to the shape of the tire and support the weight thereof, drawing the side members inwardly so as to clampingly engage the same.

Figure 2:
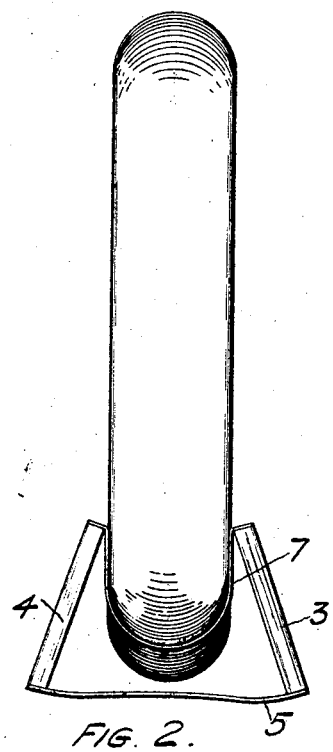

For a more comprehensive understanding of my invention reference may be had to the accompanying drawings of which:

Fig. 1 is a perspective view of a tire holder constructed in accordance with my invention; and Fig. 2 is an end elevational view of the structure illustrated in Fig. 1 supporting a tire. 70.

My invention comprises specifically two similar side members 3 and 4 which are relatively stiff, preferably being formed of wood and adapted to be used for advertising purposes. These side members are flat and of trapezoidal contour. The members 3 and 4 are connected at each end at the bottoms by means of semi-flexible metal members 5 and 6, and are connected at each end at the top by relatively more flexible members 7 and 8. The members 5 and 6 must be of sufficient rigidity to prevent the tire holder from being unstable, but must be of sufficient flexibility to permit the side members 3 and 4 to be drawn inwardly to engage the sides of the tire. These members are preferably composed of a light sheet metal of considerable resiliency. The members 7 and 8 are relatively flexible members and may be composed of fabric, rubber or the like, although very light flexible metal members are preferred.

When the tire holder is not in use, the members 5 and 6 cause the side members 3 and 4 to stand substantially vertical, no resistance being offered by the members 7 and 8. This permits the tire to be readily placed therein by an unassisted individual who merely lowers it vertically between the two side members. When the tire engages the members 7 and 8, they adapt themselves to the contour thereof and draw the tops of the members 3 and 4 inwardly into clamping engagement with the sides of the tire, thus holding it firmly, the flexibility of the members 5 and 6 being sufficient to permit such movement of the members 3 and 4, and the rigidity thereof being sufficient to prevent the holder from being unstable.

The fact that the flexible members 7 and

8 conform so closely to the contour of the tire and the tread thereon adds materially to the stabilizing properties of my device. These very flexible members so engage the tire as to oppose any tendency of the tire to move by a snubbing action in addition to the clamping action exerted on the side walls of the tire by the end members.

Although I have illustrated but a single form which my invention may assume, and have described in detail but a single application thereof, it will be apparent to those skilled in the art that it is not so limited, but that various minor modifications and changes may be made therein without departing from the spirit of my invention, or from the scope of the appended claims.

What I claim is:

1. A tire holder comprising two rigid quadrilateral members disposed in side-by-side relation, means connecting the bottom portions of said members, and spaced flexible means connecting the top portions thereof and adapted to cause the top portions to move toward each other in clamping relationship to support a tire between the members.

2. A tire holder comprising two rigid members disposed in side-by-side relation, relatively flexible means in spaced relation attached to the tops of said members and adapted to cause a clamping action of the members against a tire supported thereon, and resilient means attached to the bottoms of and adapted to support said members.

3. A tire holder comprising two rigid members disposed in side-by-side relationship, two relatively thick resilient members attached to the bottom portions of and adapted to support said members adjacent the ends thereof and two relatively thin relatively flexible members attached to the top portions of said members adjacent the ends thereof.

In witness whereof, I have hereunto signed my name.

RUFUS W. CLARK.